March 5, 1940.  C. L. OCON  2,192,238
APPARATUS AND METHOD FOR HEAT TREATING A PLURALITY OF HYDROCARBON STREAMS
Filed July 13, 1938  2 Sheets-Sheet 1
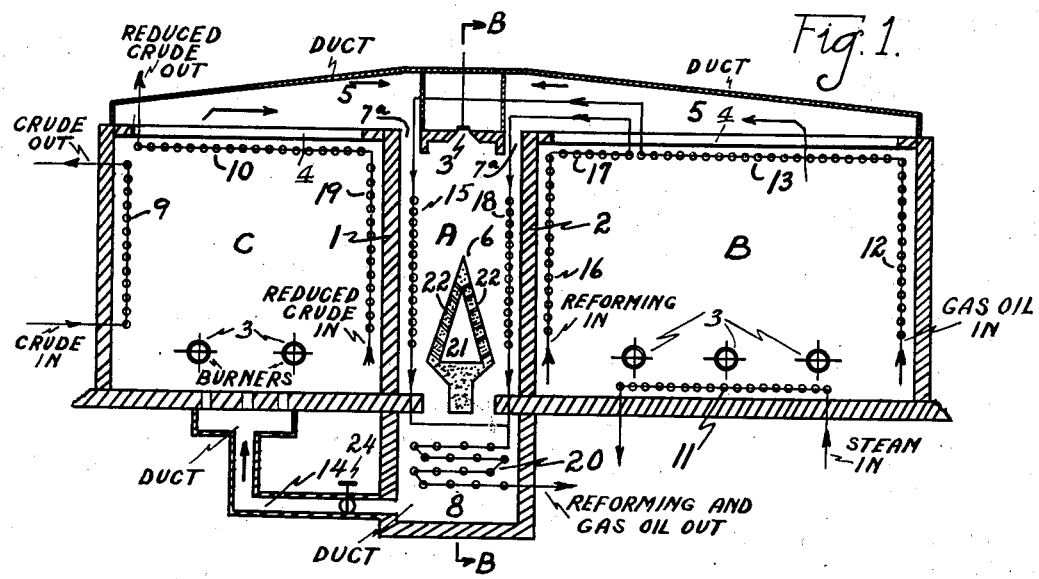
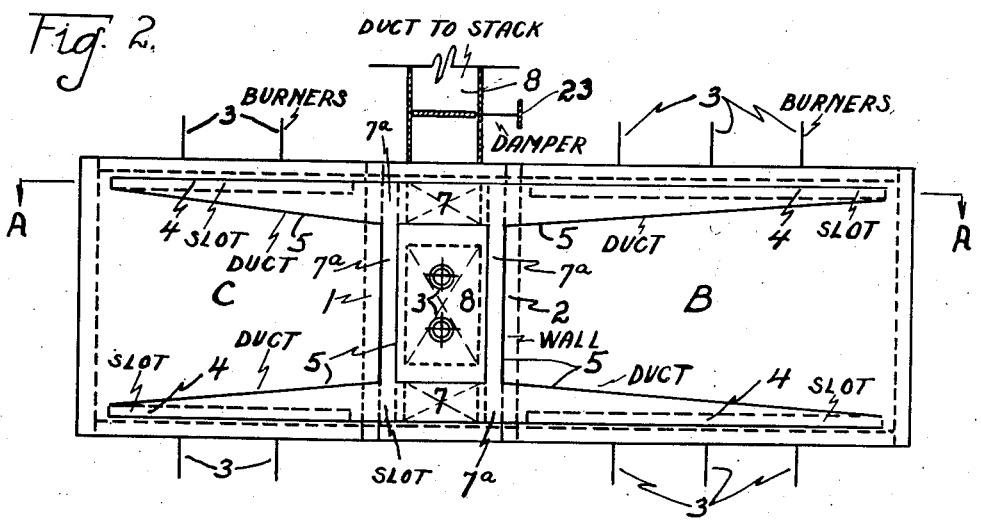
INVENTOR.

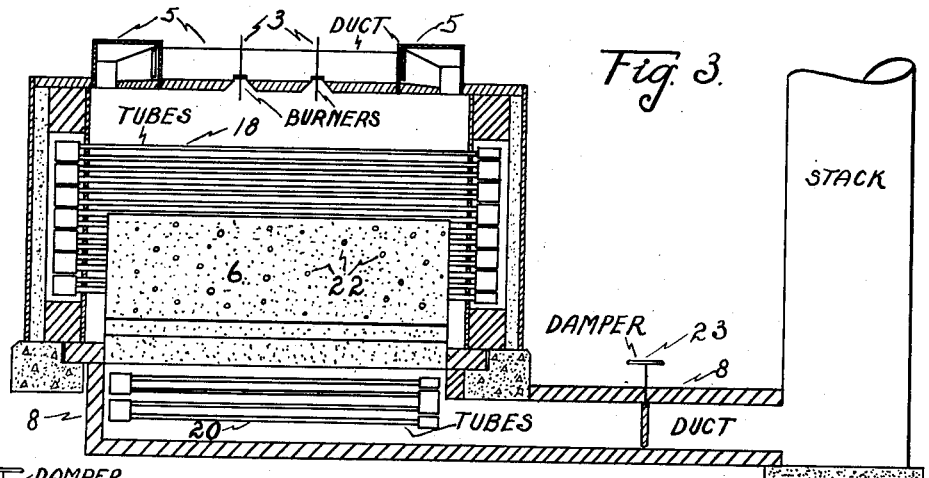
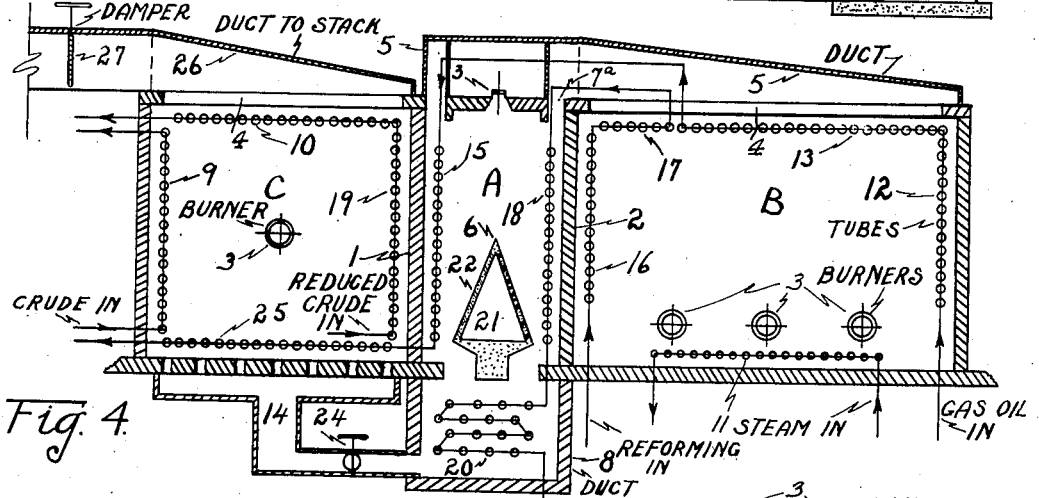
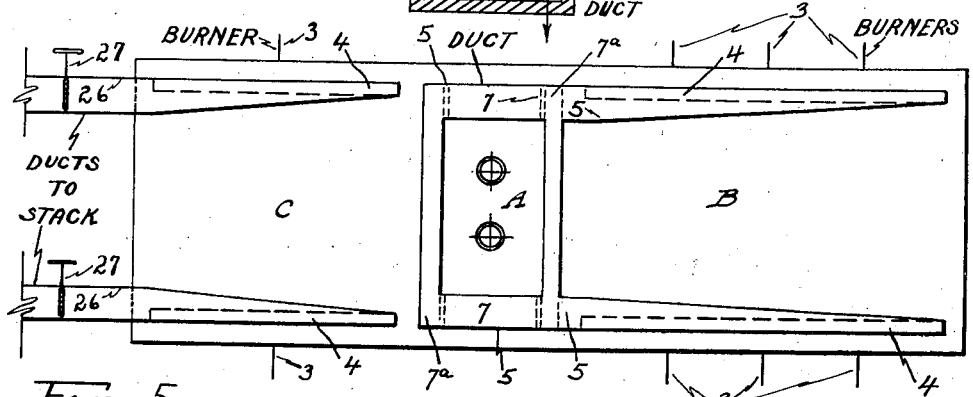

Patented Mar. 5, 1940

2,192,238

UNITED STATES PATENT OFFICE 2,192,238

APPARATUS AND METHOD FOR HEAT TREATING A PLURALITY OF HYDROCARBON STREAMS

Cecilio L. Ocon, Yonkers, N. Y.

Application July 13, 1938, Serial No. 219,044

9 Claims. (Cl. 196—116)

This invention relates to a novel method and apparatus for heat treating a plurality of hydrocarbon streams, in particular to heat treatments involving radiation heating with steps to equalize the intensity of heat absorption at each point of temperature variation.

Until the present time there has been an urgent need for the petroleum refining industry to find an efficient compact tube still heating furnace, suitable for treating several types of charging stock simultaneously while retaining all the desired elements of control.

This invention relates to a novel, economical, and efficient furnace suitably answering this need.

The main object of the present invention is to provide an efficient and economical furnace in which various hydrocarbon fractions can be simultaneously subjected under independently regulated heat and pressure most suitable for the particular characteristics and composition of the fractions undergoing treatment necessary to obtain the optimum desired results.

A further object of the present invention is to provide a furnace in which local overheating or coking is overcome and so-called hot spots found in furnaces generally used are eliminated.

A further object of the present invention is to provide a furnace with suitable gas velocities and uniform radiation to equalize heat absorption over the entire areas of tubes for higher efficiency.

These and further objects will hereinafter be brought out in the following description and claims.

In conventional furnaces now in use, substantially the only heat available in the convection section is the residual heat in flue gases conveyed to the stack from a combustion section, and this heat cannot be increased to any great extent over the designed capacity without reduction of efficiency and impairment of control. When the only radiant heating is carried out in a combustion section largely surrounded by walls exposed to air cooling, the tubes in such a radiant section are overheated on the side exposed to the flame and adversely cooled on the side exposed to the air cooled walls. In these furnaces the customary roof tubes tend to form a stagnant layer of heating gas near the roof which additionally makes the roof tubes non-uniformly heated. Attempts have been made to overcome localized heating difficulties by enlarging the radiant heating sections to immense chambers and by recycling large amounts of flue gas, but not with great success technically nor economically.

In the present invention heating can be efficiently and flexibly regulated through small gradations of temperature with automatic control of burners or firing means located in each of several sections with the aid of novel features herein disclosed, to secure the optimum conditions in simultaneous treatments of several hydrocarbon streams including sensitive vapor phase treatments in radiant heat tubes, as in reforming and vapor phase cracking and to promote equalized heating of tube surfaces at each point of variation in temperature.

Several of the prominent features which are incorporated in the novel furnace structure of this invention for obtaining the mentioned objects include: (1) a reducing of exposure to air cooling of walls surrounding an intense radiation heating section; (2) a more uniform directing of radiant rays from radiating surfaces to all parts of tubes disposed in an intense radiation heating section; (3) an effective tempering of the radiant heat absorption by directing hot combustion products over tubes undergoing intense radiation heating without extensively recycling of flue gas and (4) a more complete combustion of fuel with efficient recuperation of sensible heat from combustion products.

A further characteristic of the present invention is that due to the flue gasses passing through narrow sluices or slotlike apertures located in the furnace arch in a position crosswise to and above the roof tubes, and which extend substantially over the entire width of side combustion sections of the furnace, the gas velocities throughout these sections are controlled, providing in this manner higher efficiency and uniform heating in these sections, equal heat distribution to the tube surfaces, avoidance of stagnant gas layers surrounding roof tubes, a higher ratio of heat absorption by the tubes per unit of surface area, and ultimately a lower heat loss with an economy in fuel consumption. The flue gases from said apertures are conveyed by narrow ducts located above the furnace arch, into a central intense radiation heating chamber of relatively restricted cross-sectional area, through which the flue gases are directed over side wall tubes at a high velocity, the velocity being adjustable for the designed capacity or need for tempering radiant heat absorption by said side wall tubes.

With advantages such as mentioned, throughput capacities, temperatures and pressures may be substantially altered for each section individually, without encountering operation difficulties.

A single compact unit can be constructed according to the present invention to obtain highly favorable conditions in the treatments of the several individual fractions without sacrificing flexibility or control, and thus, eliminating the construction of several independent furnaces.

The present invention will be more fully understood from the accompanying drawings and the following description of a multi-stage furnace suitable for:

(a) The preconditioning of the initial charge for further treatment, (b) Mild cracking of the preconditioned initial charge, (c) Rigorous cracking treatment of light distillates of gas oil type and (d) Reforming straight run gasoline or light distillates of a heavy naphtha and kerosene type.

In the accompanying drawings are shown diagrammatic views of a preferred furnace construction with an illustration of a preferred method for heating different types of oils. In the drawings, Figure 1 is a sectional elevation view of the furnace taken along line A—A in Figure 2, which is a top plan view of the furnace unit, Figure 3 is a sectional elevation view along line B—B indicated in Figure 1. Figures 4 and 5 correspond to views of Figures 1 and 2, but show a modification of section C.

In Figure 1 is shown an insulated furnace divided into three sections A, B, and C by partitioning walls 1 and 2. Each section may have individual firing means 3, to supply fuel and/or combustion supporting material, e. g., air and/or steam or other oxidizing agents. Flue gases from combustion within side sections B and C, are preferably passed through narrow slot-like apertures 4 (as indicated in Figure 2) located in the furnace arch in a position crosswise to and above the banks of roof tubes, and which may extend the entire width of said sections B and C, the flow of gas upwardly through the banks of roof tubes functioning to more uniformly heat the tubes and to avoid stagnant layers of gas at the roofs. The said flue gases are conveyed by ducts 5 to roof openings 7 and 7A, into the upper end of section A.

Figure 3 shows in detail the manner in which flue gases entering through slot 7A in the upper end of section A, pass over the side wall tubes 18 and transversely thereto. Burners 3 are shown at the upper end of the central combustion section directing a flame toward the refractory porous material 6. Duct 8 is shown for leading waste heating gases to the stack and is controlled by damper 23. The stack preferably adjoins an outer wall of section A, to avoid heat loss from the adjoining wall. This construction permits further utilization of heat from waste gases for insulating otherwise unprotected walls of the intense radiation heating section. The outlet from duct 8 to duct 14, for passing a portion of the flue gas to a side combustion section, is also shown in Figures 1 and 4.

The chamber of section A preferably is in the form of a relatively narrow shaft through which products of combustion used in side sections C and B may be passed at relatively high velocities through roof openings 7 and 7A, which are positioned to direct these gases downwardly over surfaces of the side wall tubes 15 and 18. These gases at high velocity function to temper the intense radiant heat absorption by the tubes, and the velocity of these gases may be controlled by check dampers or other means located in flue gas ducts and outlets to a stack in a conventional manner. The side wall tubes 15 and 18 may be described as bordering the central combustion zone which is substantially centered on the central vertical axis B—B running through section A. At one end of this central combustion zone preferably the upper end may be located a firing means 3, for injecting combustible material, such as fuel oil, and/or material for supporting combustion such as air, steam and other agents supporting combustion. This firing means is preferably disposed to direct candescent combustion mixture or flame centrally in said combustion zone toward the outlet 8 at the lower end. The side wall tubes 15 and 18 may be described as bordering the central combustion zone or as interposed between the combustion zone and the internal surface of the partitioning walls 1 and 2 of section A. A mass of refractory porous material 6, of any suitable shape, preferably having a triangular cross section as shown in Figure 1, projects from the floor at the outlet end of chamber A into an intermediate point spaced from the firing means 3, in the central combustion zone. The mass of refractory porous material 6, functions advantageously in several ways. The mass of refractory porous material becomes highly heated by the candescent combustion gases passing over its surfaces, which in turn act as foci of radiation having favorable locations for directing radiation toward the lower areas of the side wall tubes, since radiation is considered to travel in straight lines from their foci. In this manner a more uniform distribution of radiation toward the side wall tubes is obtained than can be obtained with merely a firing means. The mass of refractory porous material composed of materials such as fire brick, etc., may be considered to act somewhat catalytically at high temperatures in furthering combustion of the combustible material injected at the upper end of the central combustion zone. This action may be increased by injection of secondary material for supporting combustion, preferably a supply of preheated air injected at the surface of the mass of refractory porous material. The secondary air may be led into the combustion zone by means of a duct 21 and ports 22, located in the mass of refractory porous material 6. By having the mass of refractory porous material 6, in the shape such as shown with its apex at an intermediate point in the central combustion zone it is possible to divide the combustion products into two controlled streams as they approach the outlet end 8. The mass of refractory porous material 6, may be mounted so as to permit a shifting of its position as for example, on a rotating axis which will afford a flexible means for further controlling the gas velocities and radiation heating in section A.

An additional factor for uniformity of radiation heating in chamber A, is provided by the radiating surfaces of the side walls 1 and 2 adjacent to the side wall tubes 15 and 18. By serving as walls common to the chamber A and adjoining combustion sections C and B in the same furnace, these walls are heated both externally and internally with respect to their internal radiation surfaces facing or bordering the central combustion zone in section A. In receiving sufficient heat from both sides as described these internal radiation surfaces effectively transmit heat radiation to areas of the side wall tubes 15 and 18 which are not exposed to the direct radiation from the central combustion zone.

Briefly describing the operation of such a furnace for the simultaneous treatment of various hydrocarbon fractions: a crude oil is pumped into and preheated in coil 9, disposed within area C, close to an outer wall for preconditioning and for further treatment such as selective fractionation. A hot charging stock of reduced crude is pumped through a reduced crude conditioning or mild cracking coil 19, disposed within said area of section C and preferably as wall tubes therein close to partitioning wall 1, said reduced crude entering said coil 19, for example, through the lowermost tube, flowing in an upward direction and continuing through a bank of roof tubes 10, disposed in the upper section of said area.

The reduced crude enters coil 19, heated, say to about 550 to 750° F., is gradually raised in temperature to from about 800 to 900° F., approximately at which temperature it is discharged from the heating zone.

Water or steam may be raised in temperature and if desired superheated in a steam superheater coil 11, disposed in the lowermost section of area B. A charging stock composed substantially of gas oil type is heated in coil 12 to rigorous cracking temperature for example, from about 900 to 1200° F. Coil 12, is disposed in area B, opposite dividing wall 2 and communicates with a bank of roof tubes 13, disposed in the upper part of area B, continuing through a wall bank of tubes 15, disposed in area A, adjacent dividing wall 1, wherein the desired cracking temperature is obtained, and thence through a digesting coil 20, disposed below the area A, wherein the cracking reaction is allowed to be completed without overheating. When it is desired to reform straight run distillates for example, straight run gasoline, heavy naphtha, kerosene or a mixture of such distillates, such distillates may be pumped into a reforming coil 16, disposed in area B, adjacent to dividing wall 2, which communicates with roof tubes 17, also within area B, continuing through side wall tubes 18, disposed in area A, adjacent to partitioning wall 2, and thence passed into digesting coil 20, jointly with the cracked products from tubes 15.

The combustion gases from the central chamber A leave the furnace via duct 8, to prevent loss of heat of the products undergoing digestion in coil 20, and part of said combustion gases may be recycled by being passed via duct 14, controlled by damper 24, to section C at a point below the burners 3, to increase the volume of hot combustion gases in said section C. Although coils 15 and 18 are illustrated as discharging into a coil 20, each of said coils may discharge into an individual coil disposed in duct 8, for completion of their reactions and digestions.

In Figure 2, 4 indicates the slotlike apertures in the furnace arch, narrow ducts 5, are for conveying hot flue gases to roof openings 7, at the upper end of area A. The flue gases leave via duct 8, below the furnace floor to the stack. The flow of gases being controlled by a damper 23.

Figure 4 illustrates a modification of section C, which permits spent gases passed from duct 14, to pass underneath floor tubes 25, through which products from radiation heated tubes 15, are passed for digestion. These gases passed between floor tubes 25, maintain the tubes uniformly heated by avoiding excessive radiation heat absorption indirectly from the floor of this section. Also according to this modification the spent gases may be withdrawn by overhead duct 26 having damper 27, to the stack without being passed to the central radiation heating section A. In this manner section C is equivalent to a convection section. The tubes in this section absorb heat from hot spent gases from duct 14.

When higher temperatures are desired in this section, auxiliary heating means 3 may be employed, preferably disposed in the central part of this section to avoid heating directly from the firing means.

Figure 5 is a plan view of Figure 4, illustrating the roof ducts and roof openings. The spent gases of section B, flow upwards through the narrow slots or openings 4 and conveyed by means of ducts 5, downwardly into section A by roof openings 7 and 7A, the temperature being increased therein by roof burners. The combined hot spent gases from sections A and B passed upwardly through section C, leave through roof openings 4 and are conveyed overhead by ducts 26, to stack.

The exact size of furnace, number, length and diameter of tubes, extent of heat applied and temperatures maintained in the radiant sections, rate of absorption, pressures, etc., depend on the treatments desired, designed capacity and characteristics of charging stocks.

The disposition of the tubes can be varied within the scope and theory of the invention, for example, floor tubes 25, may be used as the digestion section for the reforming and gas oil fractions in place of tubes 20, and tubes 20, may be used for superheating water or steam; or, floor tubes 25 of section C, in Figure 4, may be used as the digestion section for the reforming and tubes 20 as the digestion section for the gas oil, and it is to be understood that this invention is not to be limited to the particular form of apparatus herein described nor to any specific disposition of tubes as shown herein for the purpose of illustration, for example, tubes may be connected for parallel flows. Spent gases from duct 8 may be passed underneath floor tubes 25 of section B when said tubes are used as the digestion zone for the reforming products of tubes 18, or for the cracked gas oil products of tubes 15.

It is to be understood that other materials for supporting combustion may be used with air and steam such as nitro-organic compounds, e. g., propyl nitrite, or oxy-organic compounds such as ethers. These added materials may be brought into contact with the flue gases flowing through the combustion zones. Thus the heat energy is increased securing greater heating efficiency by increasing the radiant ratio due to the complete combustion of said flue gases by the passage of the combustion promoter gases and resulting in less waste of heat and economy in fuel consumption and costs.

It is to be understood that air cooled end walls may be used if desired. Also gas burners located on the floors of the furnace or any other suitable heating medium may be used instead of combination oil and gas burners in the walls as shown. The mass that projects from the floor of the outlet end of chamber A is preferably of refractory porous material but may be of any other suitable material capable of directing radiation to the lower area of the side wall tubes.

The length and width of apertures 4, will depend upon the area required to secure the desired flue gas velocity due to heat liberation.

Instruments, compressors, pumps to force hot oil and water into the coils, valves, etc., are not shown or indicated but it is to be understood they will be used for the operation described as required and as is well known in the art.

The heretofore illustrated and described tube still heating furnace may vary considerably and other refining phases requiring heat treatments may be carried out within the present invention.

Having described my invention, what I desire to secure by Letters Patent is:

1. A hydrocarbon oil heating tube still furnace comprising, an intense radiation heating chamber in the form of a shaft enclosed by substantially vertical side walls, side wall tubes in said shaft, top and bottom openings in said shaft for ingress and egress of gases, a firing means at the ingress end positioned to direct a flame centrally through the shaft toward the egress opening, a combustion section within said furnace sharing a side wall of said radiation heating chamber, roof tubes in said combustion section, outlets for combustion products in said combustion section above said roof tubes, a duct for passing gases withdrawn through said outlets into the ingress opening of the intense radiant heating section.

2. A hydrocarbon oil heating tube still furnace comprising, a fire combustion section, an intense radiant heat chamber adjoining said fire combustion section and having a central flue bordered by side walls, side wall tubes disposed along said side walls for absorbing heat from hot flue gases flowing from said adjoining fire combustion section into said chamber, a mass of refractory material at the exit end of said flue, a firing means positioned at the end opposite to said exit end of said flue to direct a flame toward said mass of refractory material to produce intense radiation heat received by said side wall tubes, means for introducing hot flue gases from the combustion section at the firing end near the said side walls of the central flue to pass over said side wall tubes bordering the central flue, and means for withdrawing waste heating gases from said chamber after they pass said mass of refractory material.

3. A hydrocarbon oil heating tube still furnace in accordance with claim 2, comprising a means for introducing a combustion promoting agent to the flue gases passing over said mass of refractory material.

4. A hydrocarbon oil heating tube still furnace having an intense radiant heating section between two combustion sections, each combustion section having a firing means, roof tubes in said combustion sections adjoining the intense radiant heating section, outlets in said combustion sections for heating gases above said roof tubes, wall tubes in said radiant heating section, and means for directing heating gases from one of said outlets over said wall tubes in said radiant heat section.

5. A hydrocarbon oil heating tube still furnace having an intense radiant heating section between two combustion sections, individual firing means in each combustion section, means for directing flue gases from one of said combustion sections into said intense radiant heating section, side wall tubes in each section, roof tubes in each combustion section, firing means at the upper part of the intense radiant heating section, means for leading flue gases downwardly in said intense radiant heating section jointly with flue gases introduced from said one combustion section, a mass of refractory material to form radiant heating surfaces disposed at the lower part of said intense radiant heating section, and means for removing the flue gases from the lower part of said intense radiant heating section.

6. A method of heat treating hydrocarbons in a tube still which consists in passing the hydrocarbons through tubular conduits bordering a central combustion zone within heat radiating surfaces receiving heat from an external source by conduction, injecting combustible material and material supporting combustion into one end of said combustion zone to produce a flame directed toward the opposite end of said zone, directing said flame over the surface of a mass of refractory material located in its path toward said opposite end of said zone, directing over said tubular conduits hot gaseous products of combustion from another combustion zone located externally to said central combustion zone, and removing used gases from said opposite end of the central combustion zone.

7. A method as described in claim 6 in which a secondary combustion supporting material is introduced into combustion gases passing through said central combustion zone as they pass over the surface of said mass of refractory material.

8. A hydrocarbon fluid tube still furnace comprising a plurality of heating sections serially interconnected so that used heating gases originating in an initial heating section are exhausted as flue gases serially through said heating sections, firing means in each of the heating sections for producing hot currents of flaming combustion products, a bank of tubes in one of said sections disposed to receive radiation from flaming combustion products originating therein without obstructing their path, means for directing used combustion products originating in a preceding section over said bank of tubes to protect the tubes from flaming combustion products and to temper their heat absorption, said bank of tubes being adjacent to a floor structure and below a firing means which directs combustion gases to a gas outlet opposite to said floor structure, and said floor structure containing passages for the combustion products from said preceding sections.

9. A hydrocarbon oil heating tube still furnace comprising an intense radiation heating zone shaft having top and bottom ends and having side walls common to adjoining combustion sections, side wall heat absorbing tubes within said shaft, a firing means at one end of said shaft for producing and directing a flame centrally through said shaft, means for passing relatively cool gases along said side walls and over said side wall tubes to mask said tubes from the flame, means for removing used combustion heating products from the end opposite the firing means, means for leading a portion of said used combustion heating products removed from said shaft into an adjoining combustion section, and heat absorbing tubes disposed within said adjoining combustion section obstructing the path of said used combustion heating products in a manner to absorb tempered heat therefrom.

CECILIO L. OCON.